(12) United States Patent
Chen et al.

(10) Patent No.: US 8,976,491 B1
(45) Date of Patent: Mar. 10, 2015

(54) DISK DRIVE HEAD SUSPENSION DISTAL NON-OP SHOCK LIMITER WITH BRANCHED ARMS

(71) Applicant: Western Digital Technologies, Inc., Irvine, CA (US)

(72) Inventors: Yih-Jen D. Chen, Pleasanton, CA (US); Kia Moh Teo, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 25 days.

(21) Appl. No.: 13/918,876

(22) Filed: Jun. 14, 2013

Related U.S. Application Data

(60) Provisional application No. 61/821,358, filed on May 9, 2013.

(51) Int. Cl.
*G11B 21/22* (2006.01)
*G11B 5/48* (2006.01)
*G11B 5/54* (2006.01)

(52) U.S. Cl.
CPC .................................. *G11B 5/4833* (2013.01)
USPC ...................................................... 360/245.7

(58) Field of Classification Search
CPC ............................. G11B 5/4826; G11B 5/4833
USPC ....................................................... 360/245.7
See application file for complete search history.

(56) References Cited

U.S. PATENT DOCUMENTS

| | | | |
|---|---|---|---|
| 6,046,883 A * | 4/2000 | Miller ......................... | 360/245.7 |
| 6,075,673 A | 6/2000 | Wilde et al. | |
| 6,097,575 A | 8/2000 | Trang et al. | |
| 6,125,014 A | 9/2000 | Riedlin, Jr. | |
| 6,125,015 A | 9/2000 | Carlson et al. | |
| 6,130,863 A | 10/2000 | Wang et al. | |
| 6,137,656 A | 10/2000 | Levi et al. | |
| 6,144,528 A | 11/2000 | Anaya-Dufresne et al. | |
| 6,147,838 A | 11/2000 | Chang et al. | |
| 6,151,196 A | 11/2000 | Carlson et al. | |
| 6,178,064 B1 | 1/2001 | Chang et al. | |
| 6,181,522 B1 | 1/2001 | Carlson | |
| 6,181,673 B1 | 1/2001 | Wilde et al. | |
| 6,226,153 B1 * | 5/2001 | Tokuyama et al. ........ | 360/245.7 |
| 6,229,672 B1 | 5/2001 | Lee et al. | |
| 6,236,543 B1 | 5/2001 | Han et al. | |
| 6,246,547 B1 | 6/2001 | Bozorgi et al. | |
| 6,249,404 B1 | 6/2001 | Doundakov et al. | |
| 6,330,131 B1 | 12/2001 | Nepela et al. | |
| 6,339,518 B1 | 1/2002 | Chang et al. | |
| 6,349,017 B1 | 2/2002 | Schott | |
| 6,373,660 B1 | 4/2002 | Lam et al. | |
| 6,378,195 B1 | 4/2002 | Carlson | |
| 6,424,498 B1 * | 7/2002 | Patterson et al. .......... | 360/245.7 |
| 6,522,504 B1 | 2/2003 | Casey | |

(Continued)

*Primary Examiner* — Craig A. Renner

(57) ABSTRACT

A head suspension assembly for a disk drive includes a load beam extending from a load beam supported end to a load beam distal end, and a laminated flexure supported by the load beam. The laminated flexure includes a structural layer having a head mounting tongue, a conductive layer having a plurality of patterned traces, and a dielectric layer between the structural layer and the conductive layer. The structural layer of the laminated flexure includes a distal limiter that has a first limiter arm and a second limiter arm adjoining at a distal apex. The distal apex is disposed closer to the load beam distal end than is the head mounting tongue. Each of the first and second limiter arms splits into a plurality of branches.

13 Claims, 6 Drawing Sheets

(56) References Cited

U.S. PATENT DOCUMENTS

| | | |
|---|---|---|
| 6,538,850 B1 | 3/2003 | Hadian et al. |
| 6,583,953 B1 | 6/2003 | Han et al. |
| 6,646,832 B2 | 11/2003 | Anaya-Dufresne et al. |
| 6,661,612 B1 | 12/2003 | Peng |
| 6,665,146 B2 | 12/2003 | Hawwa et al. |
| 6,690,545 B1 | 2/2004 | Chang et al. |
| 6,704,173 B1 | 3/2004 | Lam et al. |
| 6,708,389 B1 | 3/2004 | Carlson et al. |
| 6,717,773 B2 | 4/2004 | Hawwa et al. |
| 6,721,142 B1 | 4/2004 | Meyer et al. |
| 6,744,599 B1 | 6/2004 | Peng et al. |
| 6,771,468 B1 | 8/2004 | Levi et al. |
| 6,796,018 B1 | 9/2004 | Thornton |
| 6,801,402 B1 | 10/2004 | Subrahmanyam et al. |
| 6,856,489 B2 | 2/2005 | Hawwa et al. |
| 6,873,496 B1 | 3/2005 | Sun et al. |
| 6,912,103 B1 | 6/2005 | Peng et al. |
| 6,937,439 B1 | 8/2005 | Chang et al. |
| 6,956,718 B1 | 10/2005 | Kulkarni et al. |
| 6,972,930 B1 | 12/2005 | Tang et al. |
| 6,993,824 B2 | 2/2006 | Childers et al. |
| 7,002,780 B2 | 2/2006 | Rancour et al. |
| 7,006,330 B1 | 2/2006 | Subrahmanyam et al. |
| 7,006,331 B1 | 2/2006 | Subrahmanyam et al. |
| 7,010,847 B1 | 3/2006 | Hadian et al. |
| 7,019,945 B1 | 3/2006 | Peng et al. |
| 7,027,264 B1 | 4/2006 | Subrahmanyam et al. |
| 7,085,104 B1 | 8/2006 | Hadian et al. |
| 7,099,117 B1 | 8/2006 | Subrahmanyam et al. |
| 7,113,372 B2 | 9/2006 | Segar et al. |
| 7,174,622 B2 | 2/2007 | Meyer et al. |
| 7,289,299 B1 | 10/2007 | Sun et al. |
| 7,307,816 B1 | 12/2007 | Thornton et al. |
| 7,315,435 B1 | 1/2008 | Pan |
| 7,315,436 B1 | 1/2008 | Sanchez |
| 7,414,814 B1 | 8/2008 | Pan |
| 7,436,631 B1 | 10/2008 | Fanslau, Jr. et al. |
| 7,474,508 B1 | 1/2009 | Li et al. |
| 7,477,486 B1 | 1/2009 | Sun et al. |
| 7,567,410 B1 | 7/2009 | Zhang et al. |
| 7,593,190 B1 | 9/2009 | Thornton et al. |
| 7,595,963 B1 | 9/2009 | Chen et al. |
| 7,616,405 B2 | 11/2009 | Hu et al. |
| 7,688,553 B1 | 3/2010 | Williams et al. |
| 7,729,089 B1 | 6/2010 | Hogan |
| 7,995,310 B1 | 8/2011 | Pan |
| 8,081,400 B1 | 12/2011 | Hu |
| 8,087,973 B1 | 1/2012 | Sladek et al. |
| 8,089,730 B1 | 1/2012 | Pan et al. |
| 8,164,858 B1 | 4/2012 | Moravec et al. |
| 8,199,437 B1 | 6/2012 | Sun et al. |
| 8,208,224 B1 | 6/2012 | Teo et al. |
| 8,218,268 B1 | 7/2012 | Pan |
| 8,240,545 B1 | 8/2012 | Wang et al. |
| 8,256,272 B1 | 9/2012 | Roajanasiri et al. |
| 8,295,012 B1 | 10/2012 | Tian et al. |
| 8,295,013 B1 | 10/2012 | Pan et al. |
| 8,295,014 B1 | 10/2012 | Teo et al. |
| 8,320,084 B1 | 11/2012 | Shum et al. |
| 8,325,446 B1 | 12/2012 | Liu et al. |
| 8,325,447 B1 | 12/2012 | Pan |
| 8,339,742 B1 | 12/2012 | Sladek et al. |
| 8,339,747 B1 | 12/2012 | Hales et al. |
| 8,339,748 B2 | 12/2012 | Shum et al. |
| 8,343,363 B1 | 1/2013 | Pakpum et al. |
| 8,345,519 B1 | 1/2013 | Pan |
| 8,418,353 B1 | 4/2013 | Moravec et al. |
| 8,441,896 B2 | 5/2013 | Wang et al. |
| 8,446,694 B1 | 5/2013 | Tian et al. |
| 8,456,643 B2 | 6/2013 | Prabhakaran et al. |
| 8,456,776 B1 | 6/2013 | Pan |
| 8,462,462 B1 | 6/2013 | Moravec et al. |
| 8,477,459 B1 | 7/2013 | Pan |
| 8,485,579 B2 | 7/2013 | Roajanasiri et al. |
| 8,488,279 B1 | 7/2013 | Pan et al. |
| 8,488,281 B1 * | 7/2013 | Pan ............................ 360/294.4 |
| 8,490,211 B1 | 7/2013 | Leary |
| 8,514,522 B1 | 8/2013 | Pan et al. |
| 8,533,936 B1 | 9/2013 | Puttichaem et al. |
| 8,545,164 B2 | 10/2013 | Choumwong et al. |
| 8,553,365 B1 | 10/2013 | Shapiro et al. |
| 8,587,901 B1 | 11/2013 | Puttichaem et al. |
| 8,593,764 B1 | 11/2013 | Tian et al. |
| 8,599,653 B1 | 12/2013 | Mallary et al. |
| 8,605,389 B1 | 12/2013 | Pan et al. |
| 8,611,050 B1 | 12/2013 | Moravec et al. |
| 8,611,052 B1 | 12/2013 | Pan et al. |
| 8,623,197 B1 | 1/2014 | Kobsiriphat et al. |
| 8,624,184 B1 | 1/2014 | Souza et al. |
| 8,665,566 B1 | 3/2014 | Pan et al. |
| 8,665,567 B2 | 3/2014 | Shum et al. |
| 8,665,677 B1 | 3/2014 | Panitchakan et al. |
| 8,665,690 B1 | 3/2014 | Moravec et al. |
| 8,693,144 B1 | 4/2014 | Pan et al. |
| 8,756,795 B1 | 6/2014 | Moravec et al. |
| 8,758,083 B1 | 6/2014 | Rudy et al. |
| 8,760,812 B1 | 6/2014 | Chen et al. |
| 8,770,463 B1 | 7/2014 | Puttichaem et al. |
| 8,773,664 B1 | 7/2014 | Wang et al. |
| 8,792,212 B1 | 7/2014 | Pan et al. |
| 8,792,213 B1 | 7/2014 | Vijay et al. |
| 8,797,691 B1 * | 8/2014 | Tian et al. ................... 360/294.4 |
| 2006/0262456 A1 | 11/2006 | Wang et al. |
| 2008/0144223 A1 | 6/2008 | Muraki et al. |
| 2008/0180850 A1 | 7/2008 | Rice et al. |
| 2009/0009911 A1 * | 1/2009 | Yang et al. ................. 360/245.3 |
| 2013/0244541 A1 | 9/2013 | Yaemglin et al. |
| 2013/0293982 A1 | 11/2013 | Huber |

* cited by examiner

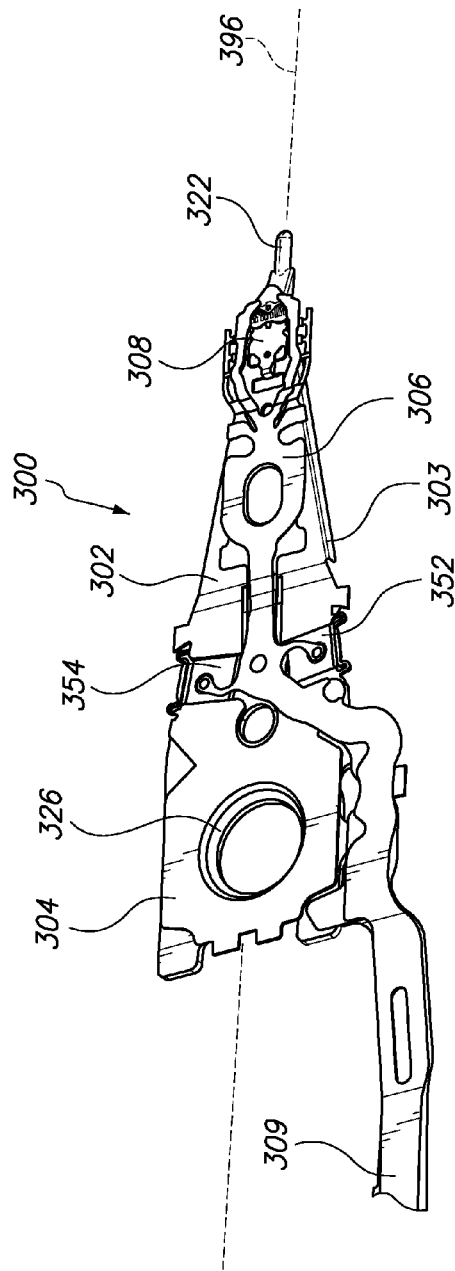
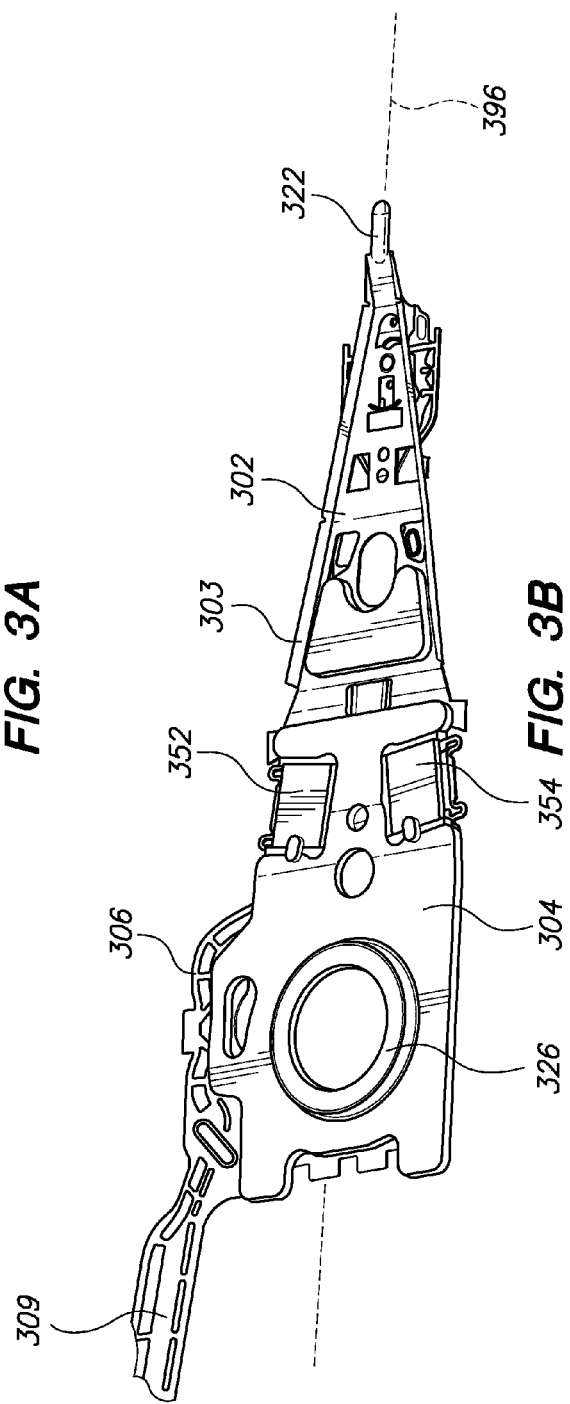
FIG. 3A
FIG. 3B

DISK DRIVE HEAD SUSPENSION DISTAL NON-OP SHOCK LIMITER WITH BRANCHED ARMS

CROSS-REFERENCE TO RELATED APPLICATIONS

This application claims priority to provisional U.S. Patent Application Ser. No. 61/821,358, filed on May 9, 2013, which is incorporated herein in its entirety.

BACKGROUND

Information storage devices are used to retrieve and/or store data in computers and other consumer electronics devices. A magnetic hard disk drive is an example of an information storage device that includes one or more heads that can both read and write, but other information storage devices also include heads—sometimes including heads that cannot write. For convenience, all heads that can read may be referred to as "read heads" herein, regardless of other devices or functions that the read head may also include or perform (e.g. writing, flying height control, touch down detection, lapping control, etc).

The typical magnetic hard disk drive includes a head disk assembly (HDA) and a printed circuit board (PCB) attached to a disk drive base of the HDA. The HDA includes at least one disk (such as a magnetic disk, magneto-optical disk, or optical disk), a spindle motor for rotating the disk, and a head stack assembly (HSA). The spindle motor typically includes a rotating hub on which disks are mounted and clamped, a magnet attached to the hub, and a stator. Various coils of the stator are selectively energized to form an electromagnetic field that pulls/pushes on the magnet, thereby rotating the hub. Rotation of the spindle motor hub results in rotation of the mounted disks. The printed circuit board assembly includes electronics and firmware for controlling the rotation of the spindle motor, for controlling the position of the HSA, and for providing a data transfer channel between the disk drive and its host.

The HSA typically includes an actuator, at least one head gimbal assembly (HGA), and a flex cable assembly. Each HGA includes and supports the read head for reading and writing data from and to the disk. In magnetic recording applications, the read head typically includes an air bearing slider and a magnetic transducer. The magnetic transducer typically comprises a magneto-resistive read element (e.g. so-called giant magneto-resistive read element, or a tunneling magneto-resistive read element), and an inductive write structure comprising a flat coil deposited by photolithography, and a yoke structure having pole tips that face a disk media. In optical and magneto-optical recording applications, the read head may include a minor and an objective lens for focusing laser light on an adjacent disk surface.

During operation of the disk drive, the actuator must rotate to position the heads adjacent desired information tracks on the disk. The actuator includes a pivot bearing cartridge to facilitate such rotational positioning. One or more actuator arms extend from the actuator body. An actuator coil is supported by the actuator body opposite the actuator arms. The actuator coil is configured to interact with one or more fixed magnets in the HDA, typically a pair, to form a voice coil motor. The printed circuit board assembly provides and controls an electrical current that passes through the actuator coil and results in a torque being applied to the actuator. A crash stop is typically provided to limit rotation of the actuator in a given direction, and a latch is typically provided to prevent rotation of the actuator when the disk drive is not in use.

The HGA typically also includes a head suspension assembly that includes a mounting plate, a load beam, and a laminated flexure to carry the electrical signals to and from the read head. The read head is typically bonded to a tongue feature of the laminated flexure. The HGA, in turn, is a subcomponent of a head stack assembly (HSA) that typically includes a plurality of HGAs, a rotary actuator, and a flex cable. The mounting plate of each head suspension assembly is attached to an arm of the rotary actuator (e.g. by swaging), and each of the laminated flexures includes a flexure tail that is electrically connected to the HSA's flex cable (e.g. by solder reflow bonding or ultrasonic bonding).

Modern laminated flexures typically include electrically conductive copper traces that are isolated from a stainless steel support layer by a polyimide dielectric layer. So that the signals from/to the head can reach the flex cable on the actuator body, each HGA flexure includes a flexure tail that extends away from the head along the actuator arm and ultimately attaches to the flex cable adjacent the actuator body. That is, the flexure includes electrically conductive traces that are electrically connected to a plurality of electrically conductive bonding pads on the head (e.g. by gold ball bonding), and extend from adjacent the head to terminate at electrical connection points at the flexure tail.

Most modern HDAs include a ramp adjacent the disk outer periphery. In such HDAs, each HGA (itself attached to the distal end of an actuator arm in the HSA) typically includes a lift-tab. The lift-tab is designed to contact a lift-tab supporting surface of the ramp when the actuator moves near an extreme position that is typically beyond the disk outer periphery. To prevent the heads from sliding off of the outer edge of the disk before they are properly unloaded, a portion of the ramp (that includes a portion of the lift-tab supporting surface) typically must extend over the disk outer periphery. That portion of the ramp overlaps the disk in a region of the outer diameter that includes a head landing zone. The head landing zone typically does not include user data, because contact with the ramp and/or disk in the head landing zone typically prevents the head from reliably reading and writing data there.

Typically at the beginning of a period when the disk drive is not in use, the actuator rotates the HSA so that each HGA's lift-tab contacts a corresponding lift-tab supporting surface, in a lift-tab pick-up region of that lift-tab supporting surface, to unload the heads from the surface of the disk. Then the actuator continues to rotate so that each of the lift-tabs slides over the lift-tab supporting surface to a lift-tab parking region where it will remain while the disk drive is not in use. The position of the HSA when the lift-tabs are in the lift-tab parking region is referred to as the parked position of the HSA.

The benefits of unloading the heads can include improved tribological performance and reliability of the head-disk interface and improved robustness to mechanical shocks that are suffered under non-operating conditions. Contemporary disk drives are designed to withstand and survive greater mechanical shocks during non-operation, than during operation. For example, the disk drive is more sensitive during operation because the fragile heads are then spaced very close to the fragile and fast moving surfaces of the magnetic disks. During non-operation, however, the fragile heads are unloaded from the surfaces of the magnetic disks, with the HGAs "parked" on a nearby ramp. Therefore, the heads are less likely to impact and thereby damage the disk surface in response to mechanical shocks when the HSA is in the parked positions.

Some mechanical shocks during non-operation may be severe. For example, a HGA may experience mechanical shock or vibration when the host system in which the disk drive is mounted is dropped or impacted. An HGA may experience an even greater mechanical shock if the disk drive is dropped or impacted before it is enclosed in a host system. When impacting a hard surface, the accelerations resulting from the mechanical shock can have a greater amplitude (and shorter duration) than when impacting a softer surface. In some cases, severe shocks can cause cracking of the electrical connections between the read head and the conductive traces of the HGA flexure, with such cracks often beginning at the locations of the maximum stress experienced by such electrical connections during a mechanical shock event. Such cracks can cause a complete failure of disk drive operation and result in catastrophic data loss.

Typical expectations and specifications for mechanical shock robustness in the disk drive industry are becoming more stringent and challenging, especially for disk drives designed for mobile applications. To meet such specifications the disk drive must be able to survive more severe mechanical shocks during non-operation than ever before. Thus, there is a need in the art for a HGA design having an improved structure for limiting head deflection in response to mechanical shocks that may occur under non-operating conditions, and/or reducing the maximum stress at read head electrical connections during such mechanical shocks.

BRIEF DESCRIPTION OF DRAWINGS

FIG. 3A is an underside perspective view of a head suspension assembly according to an embodiment of the present invention.

FIG. 3B depicts a top perspective view of the head suspension assembly of FIG. 3A.

DETAILED DESCRIPTION OF EXEMPLARY EMBODIMENTS

Figure 1:
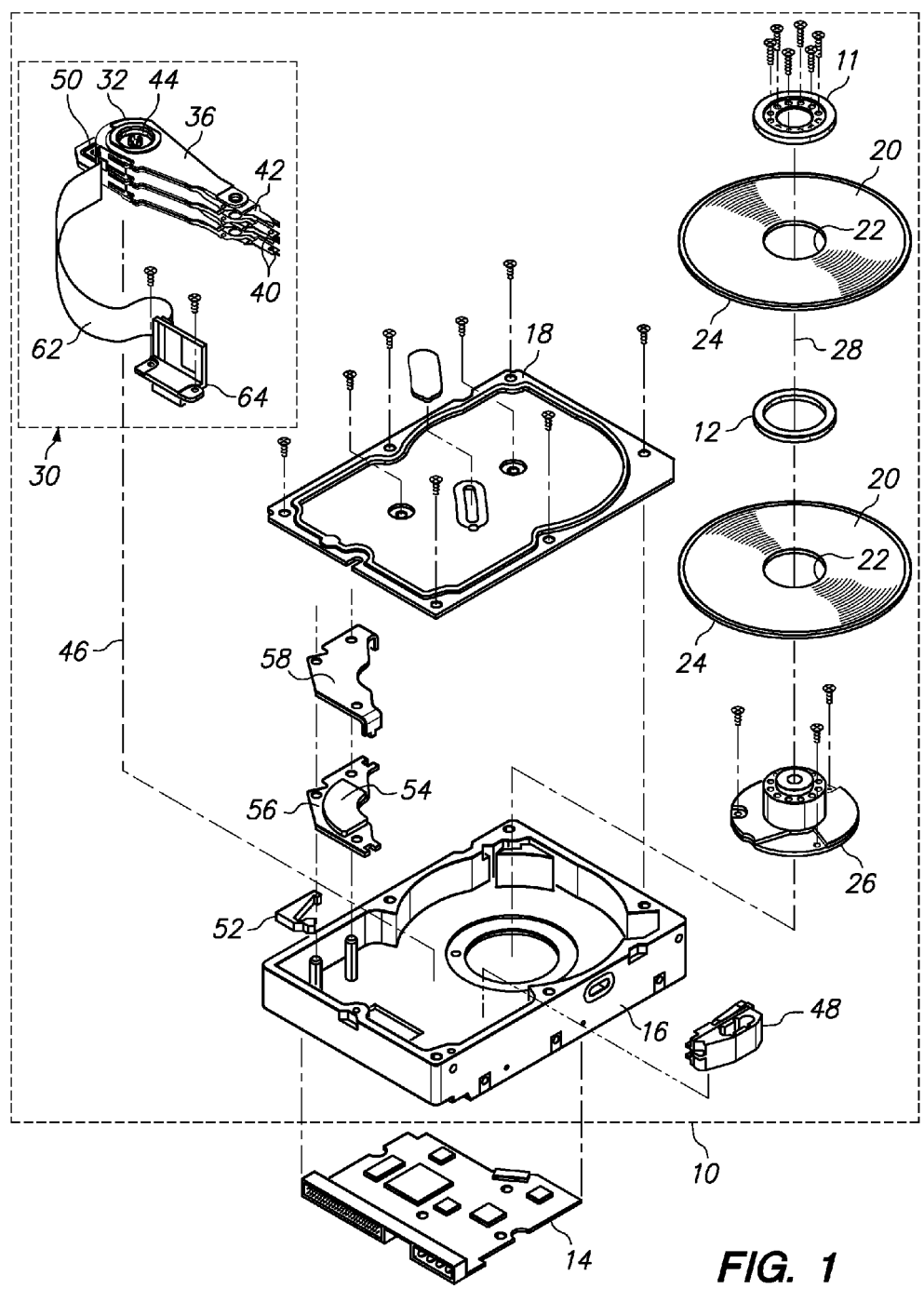
FIG. 1 is an exploded view of a disk drive that is capable of including an embodiment of the present invention.

FIG. 1 is an exploded perspective view of an example disk drive that is capable of including an embodiment of the present invention. The example disk drive includes a head disk assembly (HDA) 10 and a printed circuit board assembly (PCBA) 14. The HDA 10 includes a base 16 and cover 18 that together form a disk drive enclosure that houses at least one annular magnetic disk 20. Each disk 20 contains a plurality of magnetic tracks for storing data. The tracks are disposed upon opposing first and second disk surfaces of the disk 20 that extend between an inner disk edge 22 (corresponding to the inner diameter) and an outer disk edge 24 (corresponding to the outer diameter) of the disk 20. The head disk assembly 10 further includes a spindle motor 26 for rotating the disks 20 about a disk axis of rotation 28. The spindle motor 26 includes a spindle motor hub that is rotatably attached to the base 16 of the HDA 10. Disks 20 may be stacked and separated with one or more annular disk spacers 12 that are disposed about the hub, all held fixed to the hub by disk clamp 11.

In certain embodiments, the HDA 10 further includes a head stack assembly (HSA) 30 rotatably attached to the base 16 of HDA 10. The HSA 30 includes an actuator comprising an actuator body 32 and one or more actuator arms 36 extending from the actuator body 32. The actuator body 32 includes a bore and a pivot bearing cartridge 44 engaged within the bore for facilitating the HSA 30 to rotate relative to HDA 10 about actuator pivot axis 46. For example, the actuator body 32 may be pivotally attached to the base 16 of HDA 10, by the pivot bearing cartridge 44. One or two head gimbal assemblies (HGA) 42 are attached to a distal end of each actuator arm 36. In certain embodiments, each HGA 42 includes a head (e.g. head 40) for reading and writing data from and to the disk 20, and a load beam to compliantly preload the head against the disk 20.

In the example of FIG. 1, the HSA 30 further includes a coil support that extends from one side of the HSA 30 that is opposite head 40. The coil support is configured to support a coil 50 through which a controlled electrical current is passed. The coil 50 interacts with one or more magnets 54 that are attached to base 16 via a yoke structure 56, 58 to form a voice coil motor for controllably rotating the HSA 30. HDA 10 includes a latch 52 rotatably mounted on base 16 to prevent undesired rotations of HSA 30.

In certain embodiments, the PCBA 14 includes a servo control system for generating servo control signals to control the current through the coil 50 and thereby position the HSA 30 relative to tracks disposed upon surfaces of disk 20. In certain embodiments, the HSA 30 is electrically connected to PCBA 14 via a flexible printed circuit (FPC) 62, which includes a flex cable and a flex cable support bracket 64. The FPC 62 supplies current to the coil 50 and carries signals between the HSA 30 and the PCBA 14. Before periods of non-operation, the HSA 30 is positioned so that the HGAs 42 are moved beyond the outer disk edge 24, so that a distal tip (i.e. a load tab) of the load beam of each HGA 42 rides up on a head loading/unloading ramp 48. With the HGAs 42 "parked" on the head loading/unloading ramp 48, mechanical shock events are prevented from causing impacts between the heads 40 and the surfaces of the disks 20.

In the magnetic hard disk drive of FIG. 1, the head 40 includes a body called a "slider" that carries a magnetic transducer on its trailing end (not visible given the scale of FIG. 1). The magnetic transducer may include an inductive write element and a magnetoresistive read element. During operation the transducer is separated from the magnetic disk by a very thin hydrodynamic air bearing. As the motor 26 rotates the magnetic disk 20, the hydrodynamic air bearing is formed between an air bearing surface of the slider of head 40, and a surface of the magnetic disk 20. The thickness of the air bearing at the location of the transducer is commonly referred to as "flying height."

Figure 2:
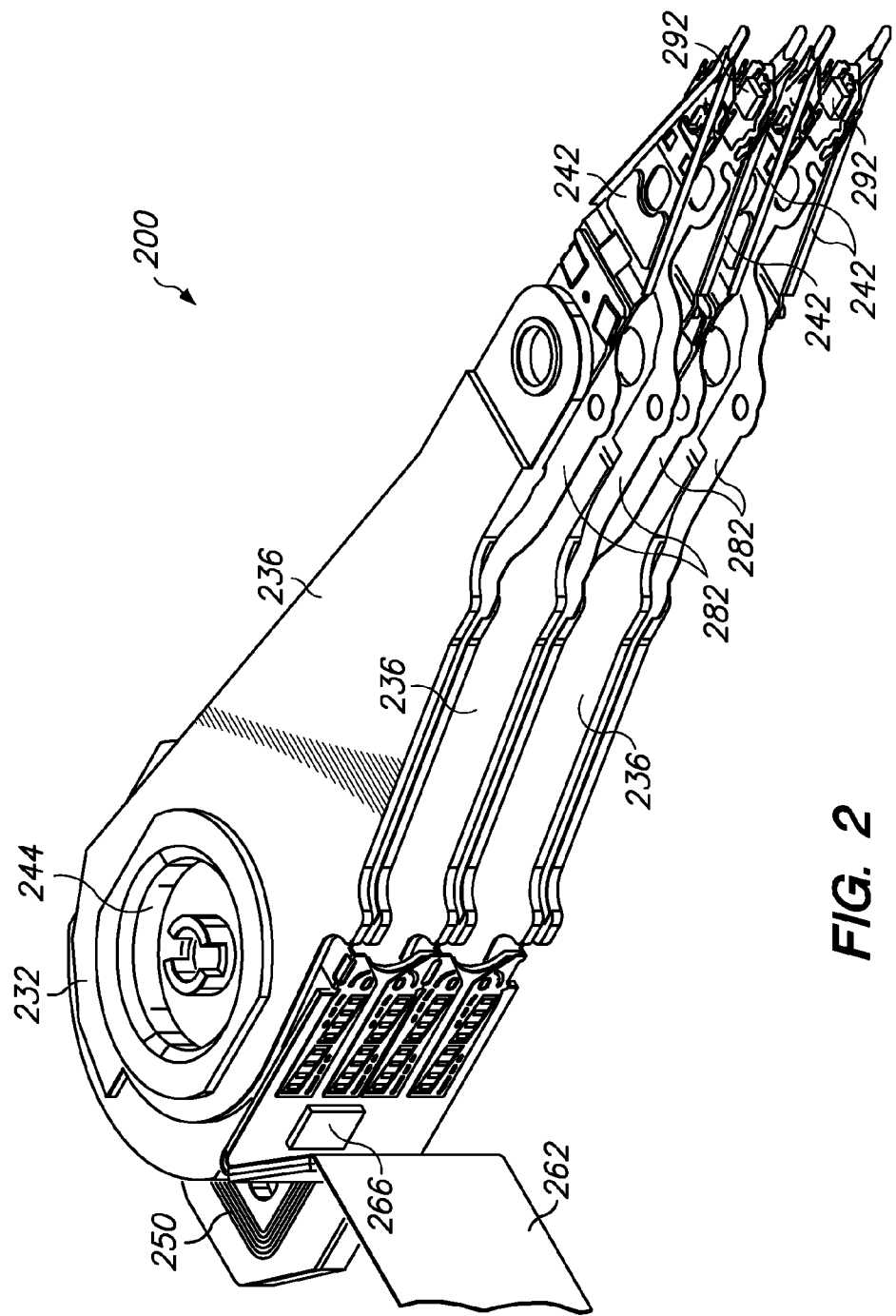
FIG. 2 is a perspective view of a head stack assembly (HSA) that is capable of including an embodiment of the present invention.

FIG. 2 is a perspective view of a head stack assembly (HSA) 200 capable of including an example embodiment of the present invention. The HSA 200 includes an actuator body 232 and a plurality of actuator arms 236 extending from the actuator body 232. The actuator body 232 may comprise aluminum, for example. The actuator body 232 may include a pivot bearing cartridge 244 disposed in a bore in the actuator, and a coil 250 that extends from the actuator body 232 in a direction that is generally opposite the actuator arms 236.

In the example of FIG. 2, the HSA 200 also includes a plurality of head gimbal assemblies (HGA) 242 attached to the actuator arms 236. For example, such attachment may be made by swaging. Note that the inner actuator arm includes two HGAs, while each of the outer actuator arms includes only one HGA. This is because in a fully populated disk drive the inner arms are positioned between disk surfaces while the outer actuator arms are positioned over (or under) a single disk surface. In a depopulated disk drive, however, any of the actuator arms may have one or zero HGAs, optionally replaced by a dummy mass.

In certain embodiments, each HGA 242 includes a head 292 for reading and/or writing to an adjacent disk surface. Each head 292 is attached to a tongue portion of a laminated flexure 282. The laminated flexure 282 is part of the HGA 242, and is attached to a load beam subcomponent of the HGA 242. The laminated flexure 282 may include a structural layer (e.g. stainless steel), a dielectric layer (e.g. polyimide), and a conductive layer into which traces are patterned (e.g. copper).

In the example of FIG. 2, the HSA 200 also includes a laminar flexible printed circuit (FPC) 262 adjacent the actuator body 232. The FPC 262 may comprise a laminate that includes two or more conventional dielectric and conductive layer materials (e.g. one or more polymeric materials, copper, etc). A preamplifier chip 266 may also be mounted on the FPC 262. Each of the laminated flexures 282 includes a flexure tail that is electrically connected to bond pads of the FPC 262.

FIG. 3A is an underside perspective view of a head suspension assembly 300 according to an embodiment of the present invention. FIG. 3B depicts a top perspective view of the head suspension assembly 300. Now referring to FIGS. 3A and 3B, the head suspension assembly 300 includes a mounting plate 304 having a swage boss 326 to facilitate attachment of the head suspension assembly 300 to an actuator arm (e.g. actuator arm 36 of FIG. 1) by the well-known conventional attachment process known as swaging. In that case, the mounting plate 304 may also be referred to as a "swage mounting plate," or "swage mount."

The head suspension assembly 300 also includes a load beam 302 that is attached to and extends from the mounting plate 304 in a load beam longitudinal direction 396, to a load beam distal end 322. In certain embodiments, the load beam may be integral with the mounting plate, or alternatively may be a separately attached subcomponent. As shown in FIGS. 3A and 3B, the load beam distal end 322 may be preferably structured as a protruding load/unload tab, which facilitates the head suspension assembly 300 to be lifted by a bearing surface of a head loading/unloading ramp (e.g. head loading/unloading ramp 48 of FIG. 1).

In the embodiment of FIGS. 3A and 3B, the head suspension assembly 300 also includes a laminated flexure 306 that is supported by the load beam 302. The load beam 302 may be made of stainless steel, and the laminated flexure 306 may be attached to the load beam by spot welding or adhesive. For example, the load beam 302 may comprise stainless steel sheet metal having a thickness in the range of 20 microns to 103 microns. In certain embodiments, the load beam 302 may include stiffening rails (e.g. stiffening rail 303) that are bent out of plane to increase bending stiffness in certain regions of the load beam 302.

In the embodiment of FIGS. 3A and 3B, the laminated flexure 306 may include a structural layer (e.g. stainless steel), a conductive layer (e.g. copper) having a plurality of patterned traces, and a dielectric layer (e.g. polyimide) between the structural layer and the conductive layer. The structural layer of the laminated flexure 306 may include a tongue 308 to which a read head may be attached (e.g. bonded by a conventional adhesive). Once a read head has been attached to the tongue 308, and conductive bonds are made between the read head and electrical connection terminals of the plurality of patterned traces, the head suspension assembly 300 and the attached head are together considered to be a head gimbal assembly (HGA).

In the embodiment of FIGS. 3A and 3B, the load beam 302 provides limited vertical compliance for a read head attached to the tongue 308 to follow vertical undulations of the surface of a disk (e.g. disk 20 of FIG. 1) as it rotates. The load beam 302 also preloads an air bearing surface of the read head (that would be attached to the tongue 308) against the disk surface by a preload force that is commonly referred to as the "gram load." In the embodiment of FIGS. 3A and 3B, a first purpose of the laminated flexure 306 is to hold and provide compliance for a read head attached to the tongue 308 to follow pitch and roll angular undulations of the surface of the disk (e.g. disk 20 of FIG. 1) as it rotates, while restricting relative motion between the read head and the load beam 302 in the lateral direction and about a yaw axis.

A second purpose of the laminated flexure 306 may be to provide a plurality of electrical paths to facilitate signal transmission to/from a read head attached to the tongue 308. For that second purpose, the plurality of patterned electrical traces in the conductive layer of the laminated flexure 306 may be connected to the read head adjacent the tongue 308, and then extend away from the read head along a flexure tail 309 of the laminated flexure 306, to reach and ultimately connect to a flexible printed circuit (e.g. FPC 262 of FIG. 2).

In the embodiment of FIGS. 3A and 3B, the head suspension assembly 300 also optionally includes first and second piezoelectric elements 352, 354. These piezoelectric elements may optionally comprise one or more of many known piezoelectric materials, for example lead zirconate titanate, lead scandium tantalite, lanthanum gallium silicate, lithium tantalite, barium titanate, gallium phosphate and/or potassium sodium tartrate. Each of the first and second piezoelectric elements 352, 354 may optionally be a laminated piezoelectric element that comprises a plurality of layers of piezoelectric material disposed between pairs of a plurality of electrically conductive electrode layers (e.g. gold layers). For example, in a single layer configuration, the piezoelectric material of each of the first and second piezoelectric elements 352, 354 may be sandwiched between top and bottom gold electrode layers (e.g. gold). As shown in the embodiment of FIGS. 3A and 3B, each of the first and second piezoelectric elements 352, 354 may be electrically connected to at least one of the plurality of conductive traces of the laminated flexure 306 to facilitate applying an electric field of a desired voltage across the piezoelectric material for fine actuation.

Figure 4:
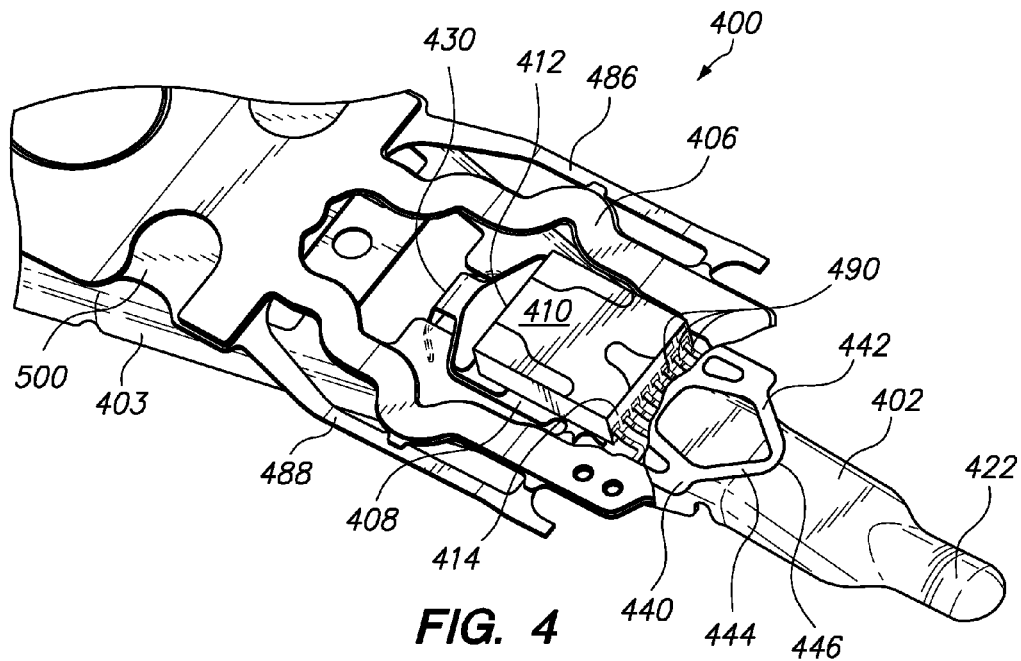
FIG. 4 depicts a distal region of a head gimbal assembly (HGA) according to an embodiment of the present invention.

FIG. 4 depicts a distal region of a head gimbal assembly (HGA) 400 according to an embodiment of the present invention. In the embodiment of FIG. 4, the HGA 400 includes a load beam 402 that includes a stiffening rail 403 and that extends to a load beam distal end 422. As shown in FIG. 4, the load beam distal end 422 may be preferably structured as a protruding load/unload tab, which facilitates the HGA 400 to be lifted by a bearing surface of a head loading/unloading ramp (e.g. head loading/unloading ramp 48 of FIG. 1). Note that the surface of the ramp upon which the distal end 422 of the load beam 402 slides when the HGA 400 is loaded or unloaded, is referred to as a bearing surface of the ramp herein.

In the embodiment of FIG. 4, the load beam 402 supports a laminated flexure 406, which includes a tongue 408 to which a read head 410 is attached. In this context, "attached to the tongue" includes being adhered directly to the structural layer 500 of the flexure 406 at the tongue 408, or being so adhered via a dielectric layer that may also be present on the tongue 408 and may interface between the adhesive and the structural layer 500 of the flexure 406 at the tongue 408. The read head 410 is electrically connected (e.g. by 90° gold ball bonding, or solder jet bonding, etc) to a plurality of connection terminals 490 adjacent the tongue 408. Each connection terminal 490 is a terminal region of one of a plurality of patterned traces in the conductive layer of the laminated flexure 406. However, in the view of FIG. 4, the dielectric layer and traces of the conductive layer of the laminated flexure 406 have been partially cut away near the connection terminals 490, to expose features of the structural layer 500 in that region.

In the embodiment of FIG. 4, the read head 410 may read and write data from and to an adjacent surface of a magnetic disk (e.g. disk 20 of FIG. 1). The read head 410 may include a slider substrate having an air bearing surface (facing the viewer in FIG. 4). The read head 410 has a head leading end 412 and a head trailing end 414. The slider substrate preferably comprises AlTiC, although another ceramic or silicon might also be used. The trailing end 414 of the read head 410 may also include a read/write transducer (too small to be seen in the scale of FIG. 4) that is preferably an inductive magnetic write transducer merged with a magneto-resistive read transducer (e.g. a tunneling magneto-resistive read transducer).

Figure 5:
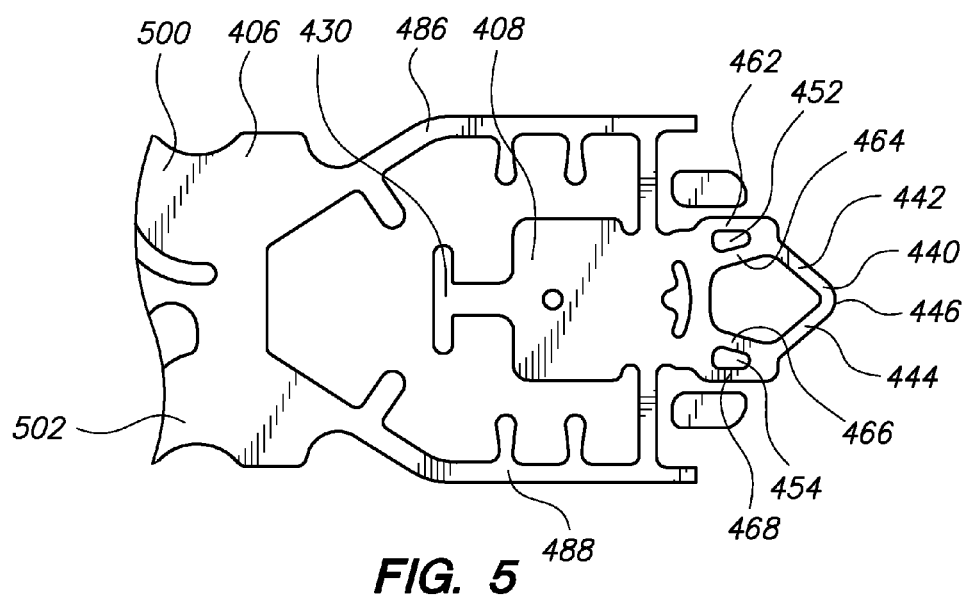
FIG. 5 depicts a distal region of the structural layer of the flexure of the HGA of FIG. 4.

FIG. 5 depicts a distal region of the structural layer 500 of the flexure 406 of the HGA 400 of FIG. 4. Now referring to FIGS. 4 and 5, certain features of the HGA 400 may advantageously improve robustness to mechanical shocks. For example, the structural layer 500 of the HGA 400 may optionally include a proximate or "leading end" limiter 430 (so called because it is disposed closer to the leading end 412 of the head 410 than to the trailing end 414 of the head 410). The proximate limiter 430 may be bent to protrude through an opening in the load beam 402, and serve to help prevent the tongue 408 of the laminated flexure 406 from separating too far from the load beam 402 during a mechanical shock event. Note that the tongue 408 is the portion of the laminated flexure to which the head 410 is bonded, and in this context "too far" may mean so far that plastic deformation of the flexure occurs. The leading edge limiter 430 can function in this way during disk drive operation, as well as when the disk drive is in the non-operating configuration (with heads parked on a ramp beyond the outer disk edge).

In the embodiment of FIGS. 4 and 5, the tongue 408 is connected, in the structural layer 500 of the laminated flexure 406, to a proximal region 502 by first and second outrigger beams 486, 488. The proximal region 502 of the laminated flexure 406 is attached to the load beam 402, for example by spot welding or adhesive bonding. The outrigger beams 486, 488 are flexible to allow the head 410 to pitch and roll with desired compliance.

In the embodiment of FIGS. 4 and 5, the HGA 400 also includes a distal, or "trailing end" limiter 440 in the structural layer 500 of the laminated flexure 406 (so called because it is disposed closer to the trailing end 414 of the head 410 than to the leading end 412 of the head 410). In the embodiment of FIGS. 4 and 5, the distal limiter 440 has a first limiter arm 442 and a second limiter arm 444 that adjoin at a distal apex 446. As shown in FIG. 4, the distal apex 446 is disposed closer to the load beam distal end 422 than is the head mounting tongue 408 or the trailing end 414 of the head 410.

In the embodiment of FIG. 5, the first limiter arm 442 includes a first opening 452 therethrough, and the second limiter arm 444 includes a second opening 454 therethrough. In the embodiment of FIGS. 4 and 5, the first limiter arm 442 splits into branches 462, 464, preferably near or adjacent the head solder bond or gold ball bond locations, i.e. preferably near or adjacent the connection terminals 490 adjacent the tongue 408 and the trailing end 414 of the head 410. The first opening 452 is defined by the gap between the branches 462, 464, and is shown to have a closed periphery. Likewise, the second limiter arm 444 splits into branches 466, 468, and the second opening 454 is defined by the gap between the branches 466, 468. In certain embodiments, such structural features of the distal limiter 440 may advantageously spread and reduce the maximum stress in the head solder bonds or gold ball bonds, that may result from certain mechanical shocks.

Figure 6:
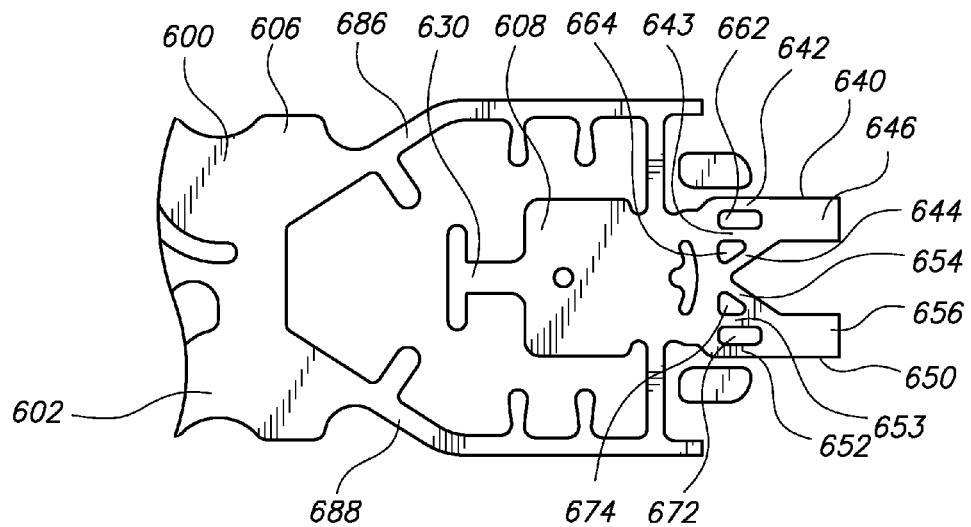
FIG. 6 depicts a distal region of the structural layer of a flexure of an HGA according to another embodiment of the present invention.

FIG. 6 depicts a distal region of the structural layer 600 of a flexure 606 of an HGA according to another embodiment of the present invention. In the embodiment of FIG. 6, the structural layer 600 of the flexure 606 includes a tongue 608 to which a head may be bonded, and a proximal limiter 630 that may protrude through an opening in a load beam of an HGA. The tongue 608 is connected in the structural layer 600 of the laminated flexure 606 to a proximal region 602, by first and second outrigger beams 686, 688. The outrigger beams 686, 688 are flexible to allow the tongue 608 to pitch and roll with desired compliance.

In the embodiment of FIG. 6, the laminated flexure 606 also includes a distal limiter 640, 650 in the structural layer 600. In the embodiment of FIG. 6, the distal limiter 640, 650 has a first limiter arm 640, a second limiter arm 650 that do not adjoin. The first limiter arm 640 has a distal apex 646, and the second limiter arm 650 has a distal apex 656. In the embodiment of FIG. 6, the first limiter arm 640 includes first and second openings 662, 664 therethrough, and the second limiter arm 650 includes third and fourth openings 672, 674 therethrough.

In the embodiment of FIG. 6, the first limiter arm 640 splits into branches 642, 643, 644, preferably near the tongue 608. The first opening 662 is defined by the gap between the branches 642 and 643, and is shown to have a closed periphery. The second opening 664 is defined by the gap between the branches 643 and 644, and is shown to have a closed periphery. Likewise, the second limiter arm 650 splits into branches 652, 653, 654, preferably near the tongue 608. The third opening 672 is defined by the gap between the branches 652 and 653, and the fourth opening 674 is defined by the gap between the branches 653 and 654. In certain embodiments, such structural features of the distal limiter 640, 650 may advantageously spread and reduce the maximum stress in the head solder bonds or gold ball bonds, that may result from certain mechanical shocks.

Figure 7:
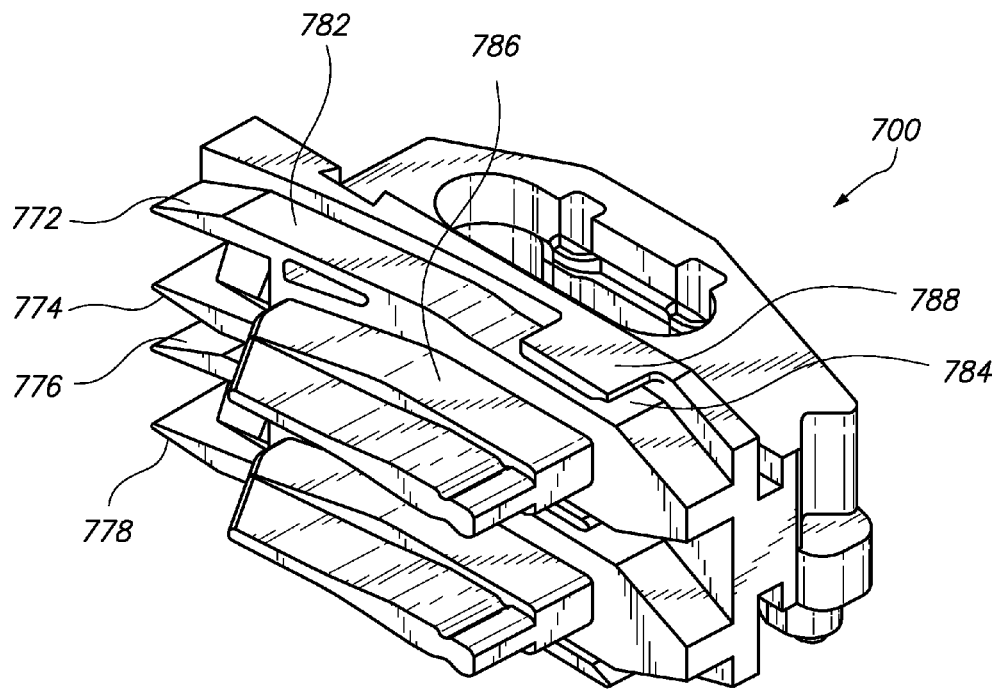
FIG. 7 depicts a head loading and unloading ramp capable of use with an embodiment of the present invention.

FIG. 7 depicts a head loading and unloading ramp 700 capable of use with an embodiment of the present invention. The head loading and unloading ramp 700 includes four similar ramps 772, 774, 776, 778, each for loading and unloading of a different head (in a disk drive having two disks and four heads). Focusing now on the features of the topmost ramp 772 (and understanding that the other ramps 774, 776, 778 have similar features), it is apparent from FIG. 7 that the topmost ramp 772 includes a bearing surface 782 upon which the distal end of a load beam slides, when the HGAs are loaded or unloaded. The bearing surface 782 includes an inclined portion (where the label 772 points) that overlies the outer edge of an underlying disk in an assembled disk drive. The bearing surface 782 also includes a parking well 784 upon which the distal end of a load beam would be parked in a non-operating condition. The ramp 700 also includes an upper shelf 788 that overlies the parking well 784, to prevent the distal end of a load beam from separating excessively from the surface of the parking well 784 during a mechanical shock event. The ramp 700 also includes a lower shelf 786 that underlies the distal limiter of a HGA flexure, with the disk drive in a non-operating condition.

Figure 8A:
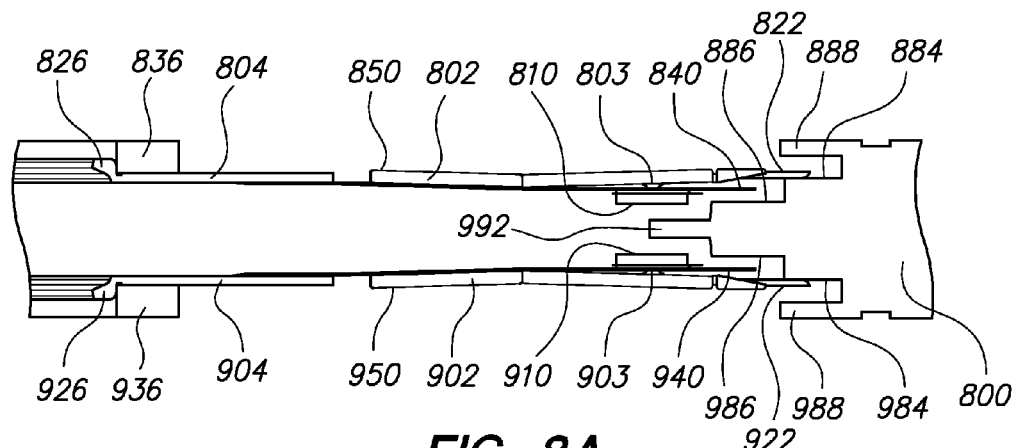
FIG. 8A depicts a side view of HGAs engaged with a head loading and unloading ramp, according to an embodiment of the present invention.
Figure 8B:
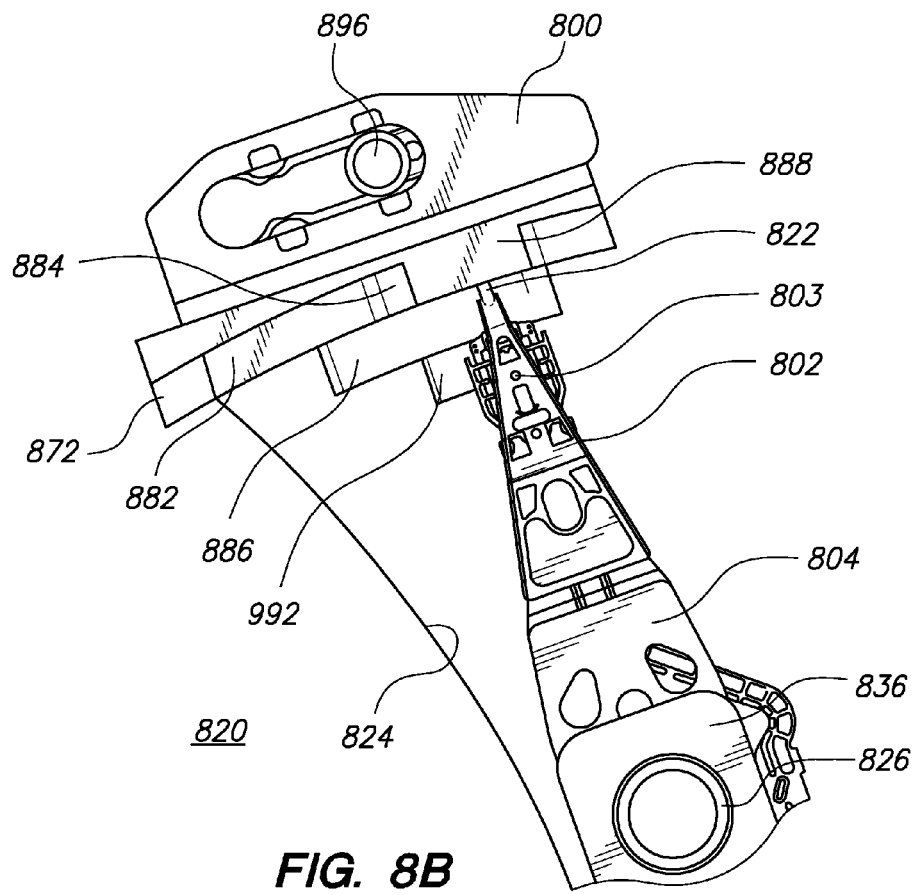
FIG. 8B depicts a top view of HGAs engaged with a head loading and unloading ramp, according to an embodiment of the present invention.

FIG. 8A depicts a side view of HGAs 850 and 950 engaged with a head loading and unloading ramp 800, according to an embodiment of the present invention. FIG. 8B depicts a top view of this engagement with the head loading and unloading ramp 800. In the embodiment of FIGS. 8A and 8B, the head loading ramp 800 is attached to a disk drive base by a fastener 896. The head loading ramp 800 includes a bearing surface 882, upon which the distal end 822 of the load beam 802 slides when the HGAs 850 and 950 are loaded or unloaded.

In the embodiment of FIGS. 8A and 8B, an annular raised swage boss 826 protrudes from a mounting plate 804 of the HGA 850, and attaches the load beam 802 of the HGA 850 to an actuator arm 836. The HGA 850 includes a flexure that has a distal limiter 840, and a head 810 that is attached to the flexure. The load beam 802 includes a dimple 803 that helps preload the head 810 against a top surface of the disk 820 during disk drive operation, and helps preload the distal end 822 of the load beam 802 against a parking well 884 of the bearing surface 882 of the ramp 800, during the disk drive non-operation condition shown in FIGS. 8A and 8B.

In the embodiment of FIGS. 8A and 8B, an annular raised swage boss 926 protrudes from a mounting plate 904 of the HGA 950, and attaches the load beam 902 of the HGA 950 to an actuator arm 936. The HGA 950 includes a flexure that has a distal limiter 940, and a head 910 that is attached to the flexure. The load beam 902 includes a dimple 903 that helps preload the head 910 against an under surface of the disk 820 during disk drive operation, and helps preload the distal end 922 of the load beam 902 against a parking well 984 of the ramp 800, during the disk drive non-operation condition shown in FIGS. 8A and 8B.

In the embodiment of FIGS. 8A and 8B, the head loading ramp 800 also includes a head separator 992 that is disposed between the heads 810 and 910 in the disk drive non-operation condition shown in FIGS. 8A and 8B. The head separator 992 serves as additional security to prevent the heads 810 and 910 from contacting each other during a mechanical shock event, but it should not be necessary in most cases because of the intended function of the distal limiters 840 and 940 that is described herein. Indeed it is not desirable for the heads 810 and 910 to deflect sufficiently to contact the head separator 992, because such excessive deflection may damage the HGAs 850, 950 and/or such contact may contaminate the read heads 810, 910.

In the embodiment of FIGS. 8A and 8B, the bearing surface 882 of the ramp 800 includes an inclined portion 872 that overlies the outer edge 824 of an underlying disk 820. The bearing surface 882 also includes the parking well 884 upon which the distal end 822 of the load beam 802 of the HGA 850 contacts in the non-operating condition that is shown in FIGS. 8A and 8B. The ramp 800 also includes an upper shelf 888 that overlies the parking well 884 and overlies the distal end 822 of the load beam 802, to prevent the distal end 822 of the load beam 802 from separating excessively from the surface of the parking well 884 during a mechanical shock event. The ramp 800 also includes a lower shelf 886 that underlies the distal limiter 840 of the flexure of the HGA 850, in the non-operating condition that is shown in FIGS. 8A and 8B. In this context, the terms "upper," "lower," "underlies," and "overlies" do not signify an orientation with respect to gravity, but rather an orientation with respect to the orientation of the HGA 850.

Also in the example non-operating disk drive condition that is shown in FIGS. 8A and 8B, the distal end of the load beam 902 contacts the parking well 984 of the head loading and unloading ramp 800. The ramp 800 also includes an upper shelf 988 that overlies the parking well 984 and overlies the distal end 922 of the load beam 902, to prevent the distal end 922 of the load beam 902 from separating excessively from the surface of the parking well 984 during a mechanical shock event. The ramp 800 also includes a lower shelf 986 that underlies the distal limiter 940 of the flexure of the HGA 950, in the non-operating condition that is shown in FIGS. 8A and 8B. In this context, the terms "upper," "lower," "underlies," and "overlies" do not signify an orientation with respect to gravity, but rather with respect to the orientation of the HGA 950.

The distal limiters 840, 940 limit extreme motions of the read heads 810, 910, respectively, but only in the non-operating configuration (with HGAs 850, 950 parked on the ramp 800 beyond the outer disk edge 824). The distal limiters 840, 940 do this by being positioned over the lower shelves 886, 986 of the ramp 800, respectively, when the HGAs 850, 950 are parked. The lower shelves 886, 986 prevent excessive downward motion of the distal limiters 840, 940, respectively. Excessive upward motion of the distal limiters 840, 940 is prevented by the load beams 802, 804, respectively, which themselves are constrained by upper shelves 888, 988 of the ramp 800 when the HGAs 850, 950 are parked.

However, forces from impact with the ramp 800 during a non-operation mechanical shock event may induce strain in the material of the distal limiters 840, 940 (e.g. stainless steel of the laminated flexure structural layer in the HGAs 850, 950, respectively). Such strain in the distal limiter 840 can cause mechanical stress in the electrical connections between the read head 810 and the connection terminals of the patterned conductive traces of the laminated flexure of the HGA 850. For example, the bonds between the head and the patterned conductive traces of the laminated flexure may be gold balls or 90° solder joints (e.g. created by solder jet bonding). Likewise, strain in the distal limiter 940 can cause mechanical stress in the electrical connections between the read head 910 and the connection terminals of the patterned conductive traces of the laminated flexure of the HGA 950.

However, according to certain embodiments of the present invention, the stress caused in the electrical connections, due to strain in the distal limiters 840, 940 during a mechanical shock event, is spread and/or reduced to reduce the risk of cracking—which may otherwise initiate in the outermost electrical connections to the read heads 810, 910. Such cracking can cause a complete lack of functionality of the affected head, and therefore also represent a failure of the disk drive. Furthermore, according to certain embodiments described herein, the maximum stress in the electrical connections to the read heads 810, 910 may be reduced without increasing the mass of the flexures near the distal ends of HGAs 850, 950, respectively, which would be undesirable from both a disk drive operating performance viewpoint and from a mechanical shock robustness viewpoint. Moreover, according to certain embodiments described herein, the maximum stress in the electrical connections to the read heads 810, 910 may be reduced without causing the distal limiters 840, 940 to be too flexible, so that the primary function of the distal limiters 840, 940 may be preserved (e.g. preventing excessive motion by temporary contact with the corresponding lower ramp shelves 886, 986 during a mechanical shock event).

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. For example, the word "preferably," and the phrase "preferably but not necessarily," are used synonymously herein to consistently include the meaning of "not necessarily" or optionally. "Comprising," "including," and "having," are intended to be open-ended terms.

What is claimed is:

1. A head suspension assembly comprising:
   a load beam extending from a load beam supported end to a load beam distal end;
   a laminated flexure supported by the load beam, the laminated flexure including
      a structural layer having a head mounting tongue,
      a conductive layer having a plurality of patterned traces leading to connection terminals adjacent the tongue,
      a dielectric layer between the structural layer and the conductive layer;
   wherein the structural layer of the laminated flexure includes a distal limiter that has a first limiter arm and a second limiter arm, the distal limiter being disposed closer to the load beam distal end than is the head mounting tongue; and
   wherein each of the first and second limiter arms includes an opening that has a closed periphery and is adjacent the connection terminals.

2. The head suspension assembly of claim 1 wherein the load beam further includes a dimple having a dimple contact location where the load beam and head mounting tongue contact each other.

3. The head suspension assembly of claim 1 further comprising a mounting plate that includes an annular raised swage boss and that is attached to the load beam supported end.

4. The head suspension assembly of claim 1 wherein the structural layer comprises stainless steel, the dielectric layer comprises polyimide, and the conductive layer comprises copper.

5. The head suspension assembly of claim 1 wherein each of the first and second limiter arms splits into a plurality of branches and the opening is defined by a gap between two of the plurality of branches that rejoin beyond the opening.

6. The head suspension assembly of claim 1 wherein the first limiter arm and the second limiter arm adjoin at a distal apex.

7. A disk drive comprising:
   a disk drive base;
   a spindle attached to the disk drive base;
   a disk mounted on the spindle;
   an actuator attached to the disk drive base and having an actuator arm;
   a head gimbal assembly (HGA) comprising:
      a mounting plate attached to a distal end of the actuator arm;
      a load beam extending from the mounting plate to a load beam distal end;
      a laminated flexure supported by the load beam, the laminated flexure including
         a structural layer having a tongue,
         a conductive layer having a plurality of patterned traces leading to connection terminals adjacent the tongue,
         a dielectric layer between the structural layer and the conductive layer;
      a read head attached to the tongue and electrically connected to the connection terminals of the laminated flexure; and
   a head loading ramp attached to the disk drive base, the head loading ramp including a bearing surface and a lower shelf;
   wherein the structural layer of the laminated flexure includes a distal limiter that has a first limiter arm and a second limiter arm, the load beam distal end contacting the bearing surface and the distal limiter overlying the lower shelf with the disk drive in a non-operating condition; and
   wherein each of the first and second limiter arms includes an opening therethrough that has a closed periphery and is adjacent the connection terminals.

8. The disk drive of claim 7 wherein the head loading ramp further comprises an upper shelf overlying the load beam distal end with the disk drive in a non-operating condition.

9. The disk drive of claim 7 wherein the HGA further includes a dimple having a dimple contact location where the load beam and laminated flexure tongue contact each other.

10. The disk drive of claim 7 wherein the mounting plate includes an annular raised swage boss.

11. The disk drive of claim 7 wherein the structural layer comprises stainless steel, the dielectric layer comprises polyimide, and the conductive layer comprises copper.

12. The disk drive of claim 7 wherein each of the first and second limiter arms splits into a plurality of branches, the opening being defined by a gap between two of the branches that rejoin beyond the opening.

13. The disk drive of claim 7 wherein the first limiter arm and the second limiter arm adjoin at a distal apex that is disposed closer to the load beam distal end than is the tongue.

* * * * *